United States Patent [19]

Svensson et al.

[11] Patent Number: 4,781,760
[45] Date of Patent: Nov. 1, 1988

[54] METHOD FOR IMPROVING THE PROPERTIES OF CEMENT MORTAR AND CONCRETE

[75] Inventors: Kjell Svensson; Sepp Zechner, both of Helsingborg, Sweden

[73] Assignee: Aluflour Aktiebolag, Helsingborg, Sweden

[21] Appl. No.: 84,081

[22] Filed: Aug. 11, 1987

[30] Foreign Application Priority Data

Sep. 9, 1986 [SE] Sweden ................................ 8603780

[51] Int. Cl.⁴ ................................................ C04B 7/13
[52] U.S. Cl. ........................................ 106/89; 106/97; 106/315; 210/751
[58] Field of Search ................... 210/751; 106/315, 89, 106/97

[56] References Cited

U.S. PATENT DOCUMENTS 3,856,541 12/1974 Martin .................................. 106/315

FOREIGN PATENT DOCUMENTS

| 56792 | 7/1982 | European Pat. Off. . | |
|---|---|---|---|
| 85287 | 8/1983 | European Pat. Off. . | |
| 713241 | 9/1966 | Italy | 106/315 |
| 55-149148 | 11/1980 | Japan | 106/315 |
| 1054316 | 11/1983 | U.S.S.R. | 106/314 |
| 1079634 | 3/1984 | U.S.S.R. | 106/314 |

*Primary Examiner*—Steven Capella
*Attorney, Agent, or Firm*—Burns, Doane, Swecker & Mathis

[57] ABSTRACT

The present invention relates to a method for improving the water separation and compression strength of cement mortar and concrete, and for extending the time taken for the cement mortar and concrete to stiffen, by adding to the mortar and concrete a waste sludge obtained by neutralizing with alkali mother liquor and optionally also contaminated gas-washing liquors obtained when producing aluminum fluoride from aluminum hydroxide and hexafluorosilicic acid. The waste sludge is added to the cement mortar and concrete in quantitites corresponding to less than 10% of a prescribed cement weight, preferably 1-5%.

9 Claims, 5 Drawing Sheets

Time subsequent to casting, hours

STIFFENING
CEMENT MORTAR (SLITE STD)
TEST TEMPERATURE + 20°C

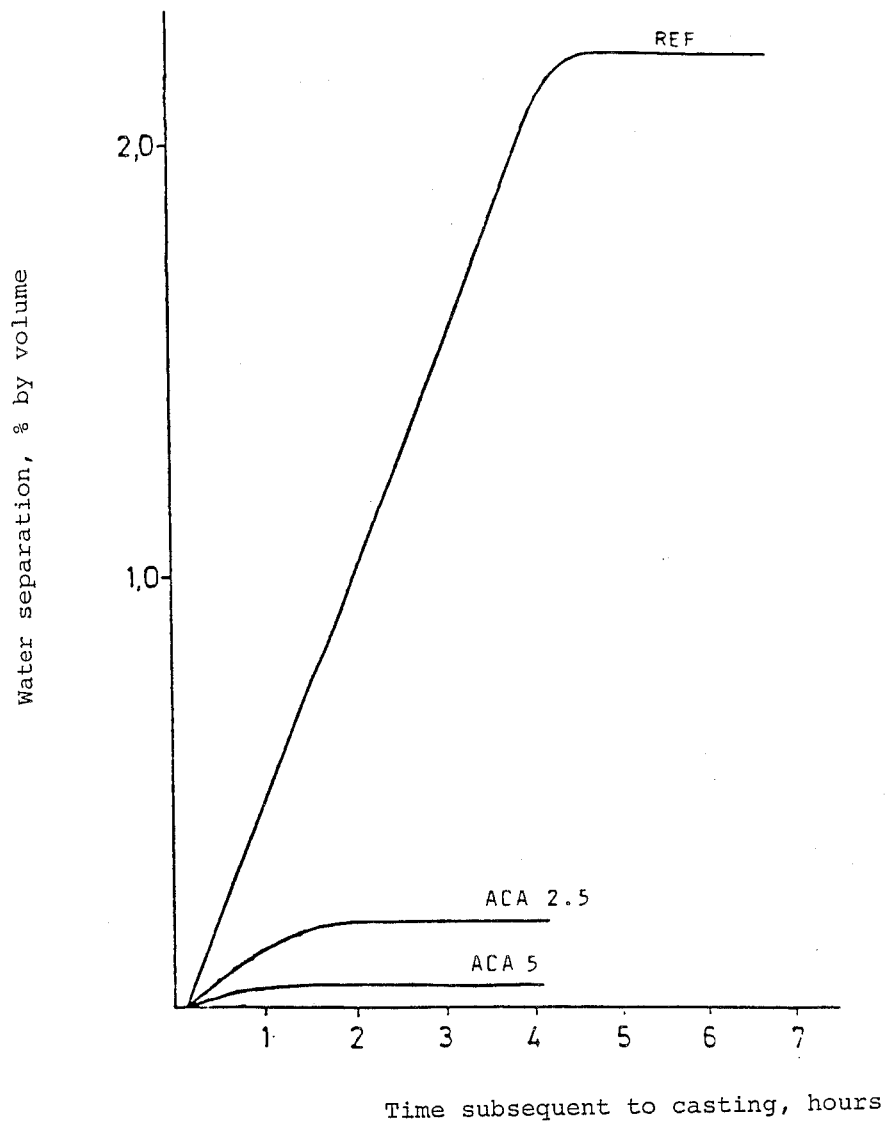
FIGURE 1  THE WATER SEPARATION TIME SEQUENCE
CEMENT MORTAR
CEMENT: SLITE STD

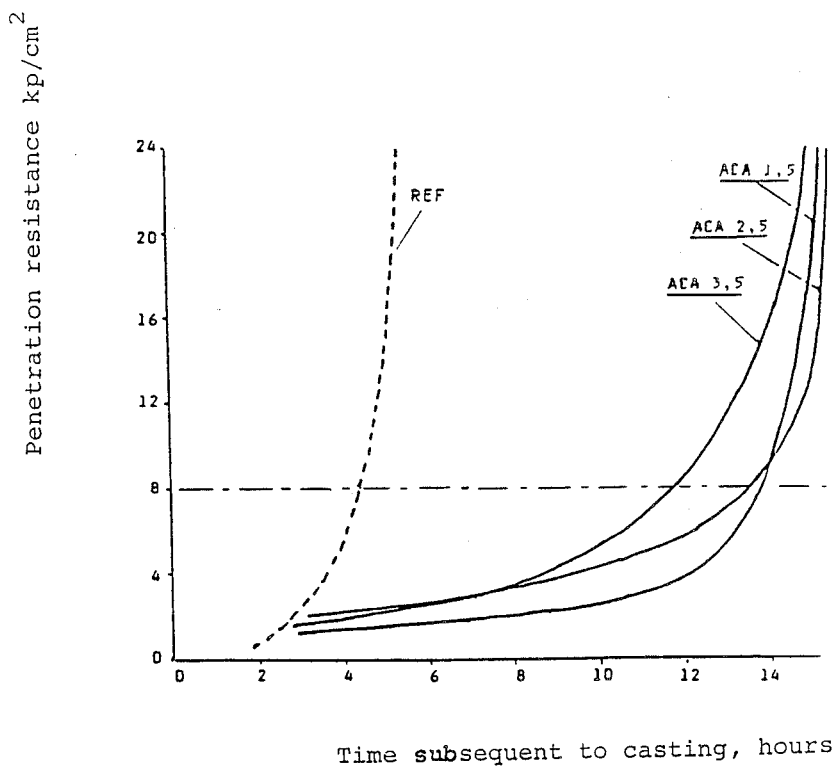
FIGURE 2  STIFFENING
CEMENT MORTAR (SLITE STD)
TEST TEMPERATURE + 20°C

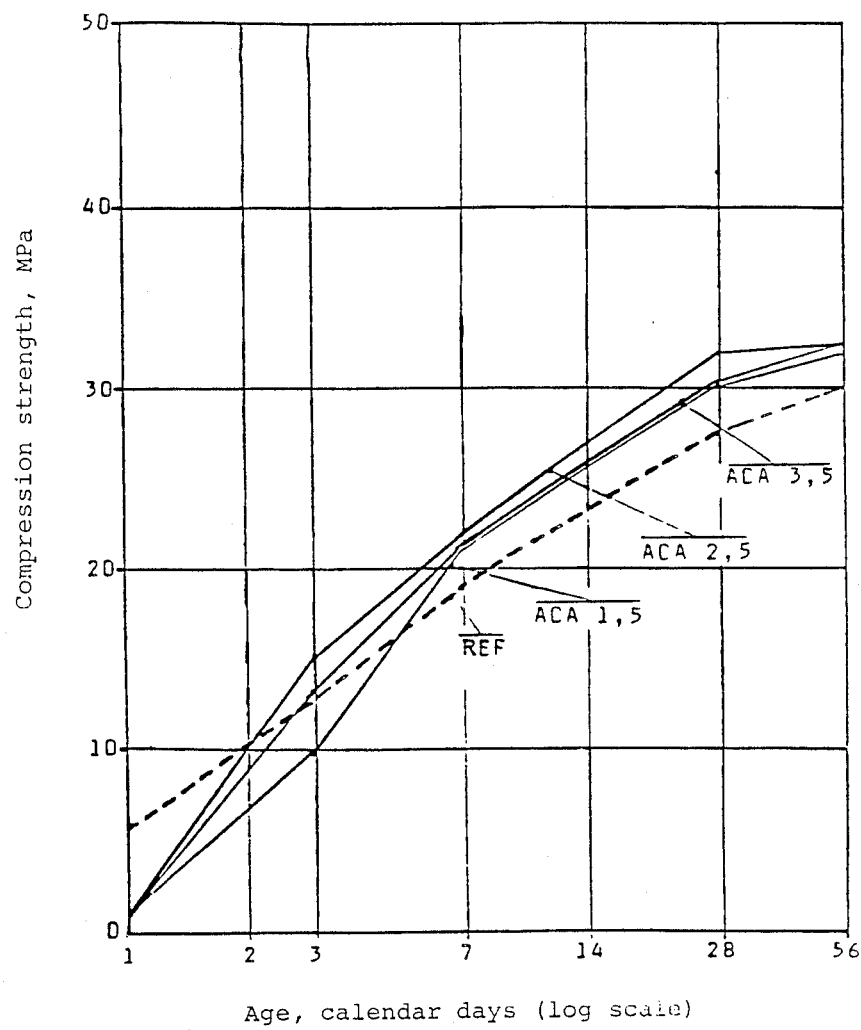
FIGURE 3   MECHANICAL STRENGTH DEVELOPMENT.
CEMENT MORTAR (SLITE STD)
TEMPERATURE:  + 20°C

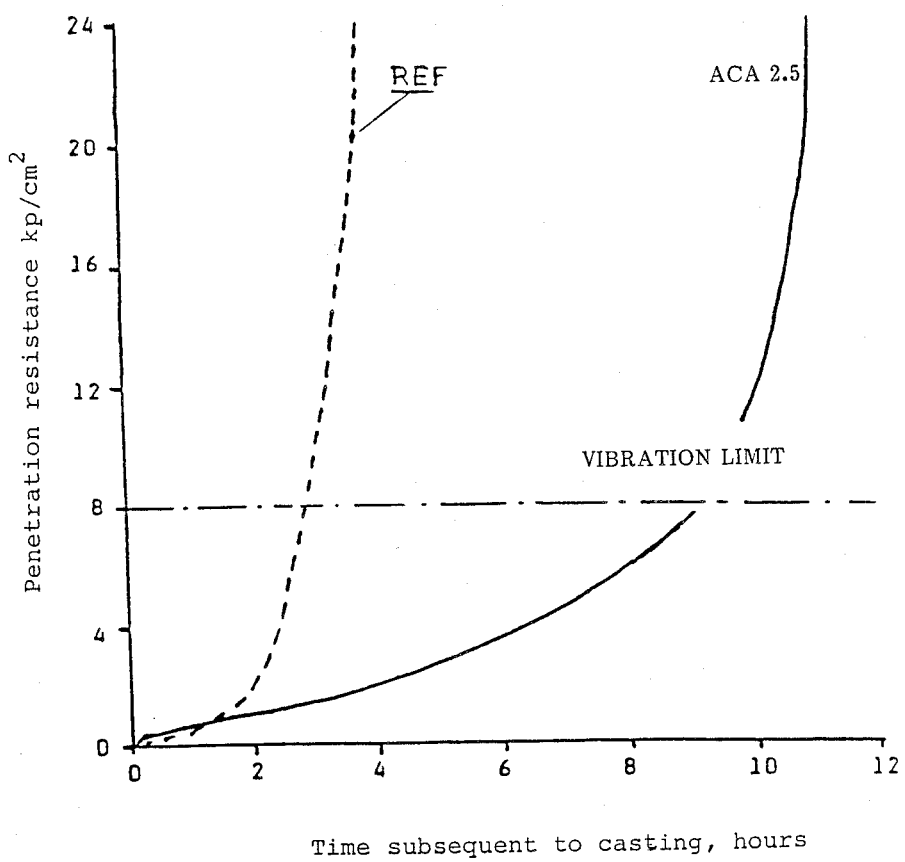
FIGURE 4  STIFFENING
CEMENT MORTAR (SLITE STD)
TEMPERATURE: + 35°C

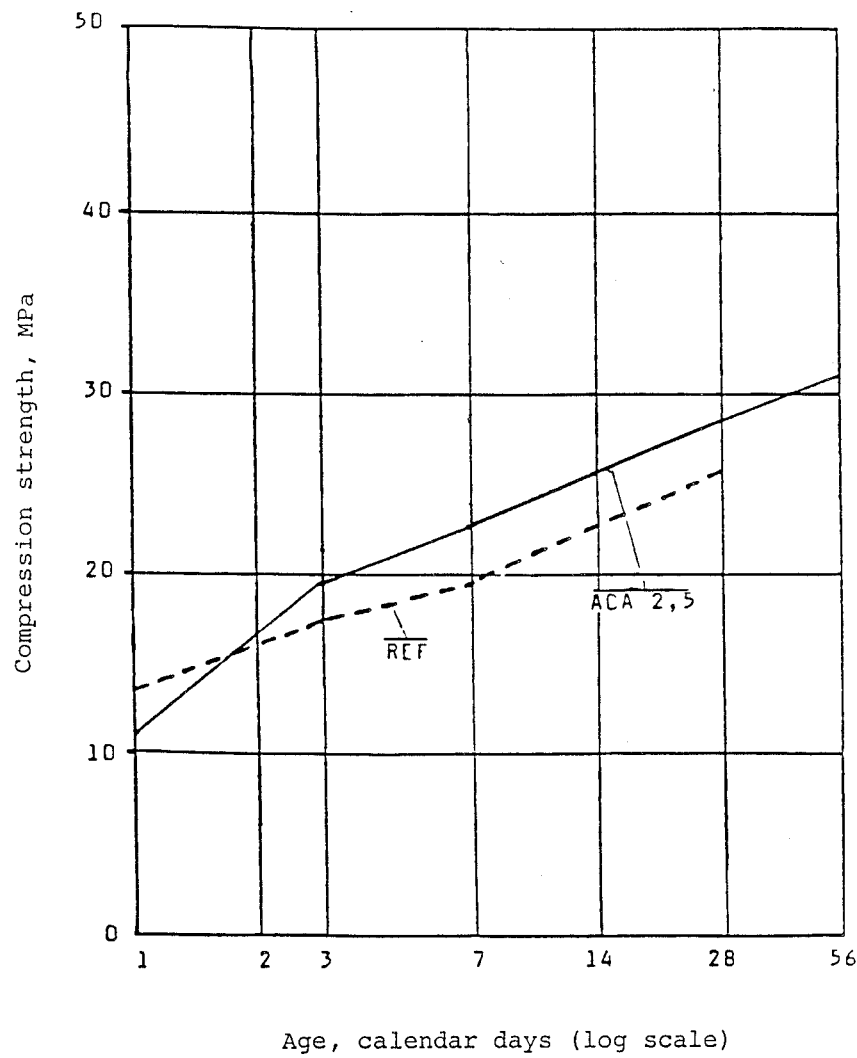
FIGURE 5  MECHANICAL STRENGTH DEVELOPMENT
CEMENT MORTAR: (SLITE STD)
TEMPERATURE: + 35°C

METHOD FOR IMPROVING THE PROPERTIES OF CEMENT MORTAR AND CONCRETE

The present invention relates to a method for improving the properties of cement mortar and concrete, optionally while adding less cement to the mortar and concrete than the prescribed amount.

The object of the present invention is to enable concrete to be molded and cast and cement mortar to be applied and worked at relatively high ambient temperatures, without the work involved being hindered by excessively rapid stiffening of the mortar or concrete. A further object of the invention is to enhance the mechanical strength of the cement mortar and concrete, thereby enabling the prescribed cement addition to be decreased while still achieving prescribed mechanical strength specifications.

BACKGROUND PRIOR ART

When producing aluminum fluoride in accordance with Austrian Patent Specification No. 259 522 and in accordance with the reaction $H_2SiF_6+2Al(OH)_3 \rightarrow AlF_3+SiO_2+4H_2O$, several troublesome waste products are obtained, which in the case of existing production plants are either safely dumped or rendered harmless, normally at significant costs.

The reactions taking place when manufacturing aluminum fluoride are given below, the waste products being underlined.

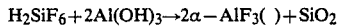

1.

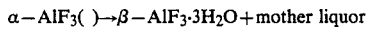

2.

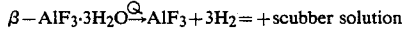

3.

As will be seen from the reaction formulae there is obtained a silica waste which contains aluminum and fluorine impurities. In addition, there is obtained from the crystalization of $AlF_3 \cdot 3H_2O$ a mother liquor, and from the gas purification process, acid washing liquors—scrubber solution—that contain aluminum, fluorine and silicon. These waste solutions are obtained in relatively large quantities and need to be subjected to expensive treatment processes, before they can be dumped. The mother liquor and washing liquors must be neutralized with calcium hydroxide to a pH of about 8–9, at which the impurities, mainly aluminum, fluorine and silicon, and also minor quantities of phosphorous, iron, nickel and chromium, precipitate out. This precipitation is then isolated from the aqueous slurry, by centrifugation for example. The resultant sludge can be dumped, although because of the consistency of the sludge it is normally necessary to first mix the sludge with a dry carrier material, normally at significant costs.

When mother liquor and gas washing liquors derived from the manufacture of aluminum fluoride from aluminum hydroxide and hexafluorosilicic acid are mixed and neutralized with calcium hydroxide to pH 8–10, preferably 8–9, the impurities are precipitated essentially in the form of aluminum fluorine and silicon, which subsequent to separation, preferably by centrifugation, are recovered in the form of sludge, whereafter the filtrate is passed to a recipient. Subsequent to drying the sludge at a temperature of about 110° C., for example in a spray dryer, flash dryer or rotating drum dryer, there is obtained an ultra-fine dust which contains 8–12% aluminum, 23–28% fluorine, 22–30% calcium, 6–15% silica and bound water corresponding to about 20% calcination loss.

At least 90% of the ultrafine dust has a particle size of between 1 and 45 μm and a specific surface area of about 2100 m²/kg according to BLAINE.

None of the methods recommended hitherto for working-up mother liquor and gas-washing liquors has been applied industrially.

SE-B-366 723 relates to a method for recovering fluorine and aluminum from diluted aqueous solutions, preferably mother liquor obtained when crystalizing aluminum fluoride, the mother liquor being treated with ammonia or ammonium carbonate to provide a chiolite-analogue ammonium compound $(NH_4)_5Al_3F_{14}$.

SE-B-No. 7502835-7 relates to the manufacture of a concentrated synthetic flux based on calcium chloride, wherein residual fluorine quantities from waste solutions subsequent to the manufacture of aluminum fluoride are precipitated with the aid of a calcium compound.

SE-A-No. 8100218-0 relates to a method for recovering usable products from the waste products described in the introduction, in which method the contaminated silica waste is dissolved in a strongly basic hydroxide. The resultant first solution is mixed with a second solution obtained by dissolving aluminum hydroxide with a strongly basic hydroxide, and with waste mother liquor and gas-washing liquor derived from the manufacture of aluminum fluoride, in proportions such that the pH of the mixture lies between 10 and 14, wherein the silicon content of the waste products concerned are precipitated as a silicoaluminate, which is isolated either for further processing or for direct use, whereafter fluorine from the waste products is recovered from the filtrate, by adding an aluminum compound in an amount sufficient to precipitate all the fluorine content as fluoroaluminate. This is isolated by filtration for further use, whereafter the final filtrate is discharged to a recipient.

SE-A-No. 8200045-6 relates to a method in which an alkali metal salt is added to a mixture of mother liquor and gas-washing liquor, whereafter an alkali metal base is added to adjust the pH to 2.0–5.0 while maintaining the temperature in the mixture above 50° C. The alkali metal fluoroaluminate precipitated from the mixture is extracted by filtration, and there is obtained a final filtrate which contains silica and minor quantities of aluminum and fluorine.

Side-by-side with these more complicated and more expensive methods remains the desire to find a use for mother liquors and gas-washing liquors obtained as waste when manufacturing aluminum fluoride.

It is known that ultrafine silicon dust, obtained as a residue when manufacturing metallic silicon or the alloying substance silicon iron, has found a use as so-called pozzolan in the manufacture of concrete (Sellevoid E. et al: Condensed silica fume in concrete; Institute for Byggningsmateriallaere, NTH, Trondheim 1982 respective Bache, H: Densified cement/ultrafine particle-based materials. Proc. 2:nd Int. Conf. on Superplasticizers in concrete. Ottawa June 10–12 1981). The silica fines comprise spheroids having a particle size of between 0.01–1 μm (about 70% <0.1 μm), i.e. about 100 times smaller than cement particles, and a specific surface area of 20,000 m²/kg.

A pozzolan reacts chemically with hydrated lime to form calcium silicate hydrates similar to those formed when hydrating cement and which provide a denser cement gel, i.e. the strength-creating component of concrete. The pozzolan effect of the silicon fines is attributed partly to the fineness of the particles, partly to their spheroidal shape, and partly to their extremely large specific surface area (Sellevold, E: Silika i betong. Virkemate som pozzolan och filler. BALLAST-DAGER, Lule Å 13-15 Sept. 1982).

BRIEF DESCRIPTION OF THE DRAWINGS

FIG. 1 is a graph illustrating water separation over time for several cement mortars.

FIG. 2 is a graph illustrating penetration resistance over time for several cement mortars.

FIG. 3 is a graph illustrating compression strength over time for several cement mortars.

FIG. 4 is a graph illustrating penetration strength over time at an elevated temperature.

FIG. 5 is a graph illustrating compression strength over time at an elevated temperature.

DESCRIPTION OF THE INVENTION

The present invention relates to the use of sludge, either dried or wet, obtained by neutralizing mother liquor and/or gas-washing liquors deriving from aluminum fluoride processes, with an alkali, preferably calcium hydroxide, to a pH greater than 7, preferably 8-9, as puzzolan in concrete or cement mortar, particularly in hot climates. The waste sludge, hereinafter considered a dry product and referred to as ACA, improves a number of the properties of cement mortar or concrete when added thereto in quantities corresponding up to 10% of the prescribed quantity of cement, preferably 1-5%, thereby enabling the amount of cement used in cement mortar and concrete to be reduced by a corresponding weight quantity.

There is normally formed on the top of horizontal wet-concrete surfaces a thin layer of water which corresponds to some percent of the total concrete volume. This is due to the fact that the concrete settles and causes a part of the water contained therein to separate, this water being pressed to the surface. The finest of the particles present often accompany this water, to form a sludge layer containing a high proportion of cement. If the concrete is excessively wet, the ballast is also liable to sink, with uneven particle distribution as a result thereof. An ACA addition corresponding to only 2-5% of the cement weight in cement mortar or concrete will reduce this separation quite considerably.

Stiffening refers to the stage in which, subsequent to being cast, the concrete gradually passes from a workable to an unworkable mass. An ACA addition corresponding to 1-3% of the cement weight delays stiffening of the concrete or mortar by up to 200% of the normal stiffening time. This retardation is often sought for when working with concrete in hot climate countries.

An ACA addition corresponding to 1-5% of the cement weight will increase the density and mechanical strength of the mortar or concrete, even if the prescribed cement addition is reduced by a corresponding weight quantity.

The pozzolan effect of ACA is quite pronounced and has not been found to have any negative effects on the concrete or mortar.

EXAMPLE 1

A reference cement mortar of quality class K30 was manufactured from Swedish standard cement (Slite Std) and ballast having a maximum particle size of 8 mm. At the same time four batches of cement mortar were manufactured in which 1·5, 2·5, 3·5, and 5·0% of the prescribed cement weight of respective batches was replaced with dried waste sludge ACA (designation ACA 1·5, ACA 2·5, ACA 3·5, and ACA 5 respectively). The tests were carried out in accordance with Swedish standards at 20° C. The following results were obtained.

The waste sludge according to these tests contained 13% $SiO_2$, 26% F, 10% Al and 24% Ca.

The abbreviation SS used in the following=Swedish Standard.

Water separation (SS No. 137112) is shown in FIG. 1. When 2.5% of the prescribed cement weight was replaced with a corresponding quantity of ACA, the separation of water decreased to about 10% of the normal separation, while when the ACA-quantity was increased to 5%, no separation of water was observed.

When monitoring the stiffening process (SS No. 137 112), i.e. the stage at which concrete and mortar, after being cast or applied, gradually pass from a workable consistency to an unworkable consistency, it was found that stiffening of the mortar to which ACA was added was delayed by 200% of the time taken for the reference mortar to stiffen, relatively, irrespective of whether the mortar contained from 1·5 to 3·5% ACA. This is verified in FIG. 2.

In the first two calendar days the compression strength (according to SS No. 137 210) of the batches containing 1·5, 2·5 and 3·5% ACA was somewhat inferior to the compression strength of the reference batch, but from the seventh day and thereafter was about 10% higher than that of the reference batch (FIG. 3).

EXAMPLE 2

Batches of cement mortar similar to those described in Example 1 were prepared with and without ACA waste. Those batches to which ACA was added contained only 2·5% ACA, however, and the tests were carried out at an air temperature of 35° C. instead of 20° C.

The stiffening process takes place much more rapidly at 35° C. than at 20° C. Notwithstanding this, stiffening of the batches containing ACA was delayed by up to about 200% of the time taken for the reference mortar to stiffen (FIG. 4).

The compression strength of the mortar also increased rapidly at the higher temperature, both in the case of the reference batch and the ACA-batches. From the third day, the ACA-batches exhibited a compression strength which was 10% greater than that of the reference batches (FIG. 5).

What is claimed is:

1. A method for improving the properties of cement mortar or concrete comprising adding to the cement mortar or concrete, waste sludge as pozzolan, said waste sludge obtained by neutralizing with an alkali to a pH greater than 7 at least one of mother liquor and gaswashing liquor derived from the manufacture of aluminum fluoride from aluminum hydroxide and hexafluorosilicic acid, said waste sludge being added in an amount of 0.5-10% by weight of the prescribed amount of cement calculated on a dry weight basis.

2. The method of claim 1 wherein the waste sludge replaces a corresponding weight of cement.

3. The method of claim 2 wherein the method is conducted at an air temperature greater than 30° C.

4. The method of claim 1 wherein the method is conducted at an air temperature greater than 30° C.

5. The method of claim 1 wherein the waste sludge comprises 6–15% silica, 8–12% aluminum, 23–28% fluorine, and 22–30% calcium, all percentages being on a weight basis.

6. The method of claim 1 wherein the sludge waste is solely derived from the mother liquor and comprises 6–15% silica, 4–6% aluminum, 9–13% fluorine, and 10–15% calcium, all percentages being on a weight basis.

7. The method of claim 1 wherein the alkali is calcium hydroxide.

8. The method of claim 1 wherein the alkali is added to obtain a pH of 8 to 9.

9. The method of claim 1 wherein the waste sludge is added in an amount of 1.0–5.0% on a dry weight basis.

* * * * *

UNITED STATES PATENT AND TRADEMARK OFFICE
CERTIFICATE OF CORRECTION

PATENT NO. : 4,781,760

DATED : November 1, 1988

INVENTOR(S) : SVENSSON et al

It is certified that error appears in the above-identified patent and that said Letters Patent is hereby corrected as shown below:

Title page:

[73] Assignee:, amend "Aluflour" to --Alufluor--.

Signed and Sealed this

Twenty-first Day of March, 1989

Attest:

DONALD J. QUIGG

Attesting Officer      Commissioner of Patents and Trademarks